(12) United States Patent
Inoue et al.

(10) Patent No.: US 10,388,934 B2
(45) Date of Patent: Aug. 20, 2019

(54) BATTERY MODULE AND METHOD FOR MANUFACTURING BATTERY MODULE

(71) Applicant: KABUSHIKI KAISHA TOYOTA JIDOSHOKKI, Aichi (JP)

(72) Inventors: Taku Inoue, Aichi (JP); Takayuki Kato, Aichi (JP); Hiromi Ueda, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 15/542,842

(22) PCT Filed: Jan. 21, 2016

(86) PCT No.: PCT/JP2016/051692
§ 371 (c)(1),
(2) Date: Jul. 11, 2017

(87) PCT Pub. No.: WO2016/132801
PCT Pub. Date: Aug. 25, 2016

(65) Prior Publication Data
US 2017/0358788 A1 Dec. 14, 2017

(30) Foreign Application Priority Data
Feb. 16, 2015 (JP) .................. 2015-027542

(51) Int. Cl.
*H01M 2/02* (2006.01)
*H01M 2/24* (2006.01)
(Continued)

(52) U.S. Cl.
CPC ........... *H01M 2/24* (2013.01); *H01M 2/0207* (2013.01); *H01M 2/1016* (2013.01);
(Continued)

(58) Field of Classification Search
CPC ............ H01M 2/02; H01M 2/22; H01M 2/24; H01M 2/0207; H01M 10/0525
See application file for complete search history.

(56) References Cited

U.S. PATENT DOCUMENTS

| 1,622,767 A * | 3/1927 | Cole .................... H01M 10/18 429/159 |
| 2004/0016455 A1* | 1/2004 | Oogami ................. H01M 2/02 136/244 |

(Continued)

FOREIGN PATENT DOCUMENTS

| CN | 103247445 | 8/2013 |
| DE | 102011116777 | 5/2012 |

(Continued)

OTHER PUBLICATIONS

International Search Report, along with English-language translation thereof, issued in PCT/JP2016/051692 dated Apr. 26, 2016.

(Continued)

*Primary Examiner* — Kenneth J Douyette
(74) *Attorney, Agent, or Firm* — Greenblum & Bernstein, P.L.C.

(57) ABSTRACT

A battery module 1 includes an array body including a plurality of battery cells held by cell holders and arranged along a predetermined array direction, and elastic members disposed between adjacent battery cells, and a restraint member applying a restraining load to the array body in the array direction. The cell holder has a protrusion protruding in the array direction, and a compression amount of the elastic member between the battery cells is regulated by the protrusion abutting on a cell holder of an adjacent battery cell.

5 Claims, 6 Drawing Sheets (51) Int. Cl.
  *H01M 10/0525* (2010.01)
  *H01M 2/10* (2006.01)
  *H01M 10/04* (2006.01)

(52) U.S. Cl.
  CPC ...... *H01M 10/0481* (2013.01); *H01M 2/0217* (2013.01); *H01M 10/0525* (2013.01)

(56) References Cited

U.S. PATENT DOCUMENTS

| | | | |
|---|---|---|---|
| 2012/0052359 A1 | 3/2012 | Yoshitake et al. | |
| 2012/0107659 A1 | 5/2012 | Phlegm et al. | |
| 2012/0141855 A1 | 6/2012 | Okada et al. | |
| 2013/0209850 A1 | 8/2013 | Yokoyama et al. | |
| 2015/0017504 A1* | 1/2015 | Isshiki .................. | B60L 3/0046 429/120 |

FOREIGN PATENT DOCUMENTS

| | | |
|---|---|---|
| DE | 102012224151 | 6/2014 |
| JP | 2003-346745 | 12/2003 |
| JP | 2007-250330 | 9/2007 |
| JP | 2009-81056 | 4/2009 |
| JP | 2012-123905 | 6/2012 |
| JP | 2012-256465 | 12/2012 |
| JP | 2013-235728 | 11/2013 |
| JP | 2014-222662 | 11/2014 |
| WO | 2012/173069 | 12/2012 |

OTHER PUBLICATIONS

Written Opinion of the International Searching Authority, along with English-language translation thereof, issued in PCT/JP2016/051692 dated Apr. 26, 2016.
German Official Action for counterpart German App. No. 112016000775.2, dated Nov. 20, 2017.
International Preliminary Report on Patentability issued in PCT/JP2016/051692 dated Aug. 22, 2017.
Chinese Office Action for counterpart CN App. No. 201680004119.3 dated Jan. 3, 2018.
Chinese Office Action in counterpart Chinese Application No. 201680004119.3 dated Jul. 2, 2018.

* cited by examiner

BATTERY MODULE AND METHOD FOR MANUFACTURING BATTERY MODULE

TECHNICAL FIELD

An aspect of the invention relates to a battery module and a method of manufacturing the battery module.

BACKGROUND ART

For example, a battery module described in Patent Literature 1 includes an array body in which a plurality of battery cells is arranged in a state held by a cell holder, and a pair of end plates that apply a restraining load to the array body in an array direction. In such a battery module, prevention of damage to an end plate when the battery cells expand or suppression of variation in restraining load acting on the array body has been attempted by disposing an elastic member between the array body and the end plate.

CITATION LIST

Patent Literature

Patent Literature 1: Japanese Unexamined Patent Publication No. 2009-81056

SUMMARY OF INVENTION

Technical Problem

Incidentally, in the battery module, a configuration in which elastic members are disposed between adjacent battery cells has been considered from the viewpoint of protection of the battery cells when the battery cells expand. In such a configuration, in order to set a compression amount of the whole elastic members when the restraining load is applied to the array body to a set value, the compression amount of the elastic member has been adjusted while measuring a distance between the end plates in the past. For this reason, improvement of assembly workability has been an issue.

An object of an aspect of the invention is to provide a battery module capable of improving an assembly workability and a method of manufacturing the battery module.

Solution to Problem

A battery module according to an aspect of the invention includes an array body including a plurality of battery cells held by cell holders and arranged along a predetermined array direction and elastic members disposed between adjacent battery cells, and a restraint member applying a restraining load to the array body in the array direction, wherein the cell holder has a protrusion protruding in the array direction, and a compression amount of the elastic member between the battery cells is regulated by the protrusion abutting on a cell holder of an adjacent battery cell.

In this battery module, the protrusion protruding in the array direction of the array body is provided to the cell holder that holds the battery cell. In addition, a distance between the adjacent battery cells in the array body is regulated by the protrusion abutting on the cell holder of the adjacent battery cell. Therefore, in this battery module, at the time of assembly, the compression amount of the elastic member between the battery cells can be regulated only by adjusting a length (a protrusion amount) of the protrusion in advance and making the protrusion abutting on the adjacent cell holder. Thus, assembly workability is improved.

The restraint member may include a pair of end plates interposing the array body in the array direction, and a connecting member connecting the pair of end plates to each other, the cell holder may have an insertion hole, the connecting member being inserted into the insertion hole, and the protrusion may have a tubular shape and communicate with the insertion hole. In this case, because the connecting member is inserted into the protrusion communicating with the insertion hole, a position shift of the cell holder in a direction intersecting the array direction may be suppressed. In addition, in the cell holder, an area in which the connecting member is inserted and an area in which the protrusion is disposed may correspond to a common area when viewed in the array direction, and miniaturization of the cell holder is attempted.

The insertion hole may have a depression corresponding to the protrusion, and the protrusion of the cell holder in the adjacent battery cell may abut on a bottom surface of the depression. In this case, the position shift of the cell holder in the direction intersecting the array direction may be further suppressed.

The protrusion may include at least one metal collar inserted into the insertion hole. In this case, damage to the protrusion may be suppressed because rigidity of the protrusion against the restraining load is increased by the metal collar.

The at least one metal collar may comprise a pair of metal collars, and each of the metal collars may be inserted into both ends of the insertion hole respectively and abut on a metal collar of the cell holder in the adjacent battery cell. When the rigidity of the protrusion against the restraining load is insufficient, creep deformation (deformation over time due to stress) may occur in the protrusion in some cases. On the other hand, it is possible to ensure the rigidity of the protrusion and to suppress the creep deformation of the protrusion by employing a configuration in which the metal collars abut on each other.

The protrusion may be inserted into one end of the insertion hole, a metal collar having a depression corresponding to the protrusion may be inserted into the other end of the insertion hole, and the protrusion of the cell holder in the adjacent battery cell may abut on a bottom surface of the depression. In this case, it is possible to ensure the rigidity of the protrusion and to suppress the creep deformation of the protrusion by employing the configuration in which the metal collars abut on each other. In addition the position shift of the cell holder in the direction intersecting the array direction may be further suppressed.

The metal collar may extend in the insertion hole to protrude from both ends of the insertion hole, and abut on a metal collar of the cell holder in the adjacent battery cell. In this case, it is possible to ensure the rigidity of the protrusion and to suppress the creep deformation of the protrusion by employing the configuration in which the metal collars abut on each other. In addition, damage to the cell holder may be suppressed because the whole restraining load acts on metal collar.

A method of manufacturing a battery module according to an aspect of the invention includes an assembly process of applying a restraining load to an array body including a plurality of battery cells held by cell holders and arranged along a predetermined array direction and elastic members disposed between adjacent battery cells in the array direction using a restraint member, wherein each of the cell holders having a protrusion protruding in the array direction is used in the assembly process to regulate a compression amount of the elastic member between the battery cells by the protrusion abutting on a cell holder of an adjacent battery cell.

In this method of manufacturing the battery module, the cell holder provided with the protrusion protruding in the array direction of the array body is used as the cell holder that holds the battery cell in the assembly process. In addition, a distance between adjacent cells in the array body is regulated by the protrusion abutting on the cell holder of the adjacent battery cell. Therefore, in this method of manufacturing the battery module, at the time of the assembly process, the compression amount of the elastic member between the battery cells can be regulated only by adjusting a length (a protrusion amount) of the protrusion in advance and making the protrusion abutting on the adjacent cell holder. Thus, assembly workability may be improved.

Advantageous Effects of Invention

According to an aspect of the invention, it is possible to provide a battery module capable of improving assembly workability and a method of manufacturing the battery module.

BRIEF DESCRIPTION OF DRAWINGS

FIGS. 4(a) and 4(b) are schematic cross-sectional views for description of an assembly process.

DESCRIPTION OF EMBODIMENTS

Hereinafter, preferred embodiments of the invention will be described with reference to accompanying drawings. In description of the drawings, the same reference numeral will be assigned to the same or corresponding element, and a repeated description will be omitted.

First Embodiment

Figure 1:
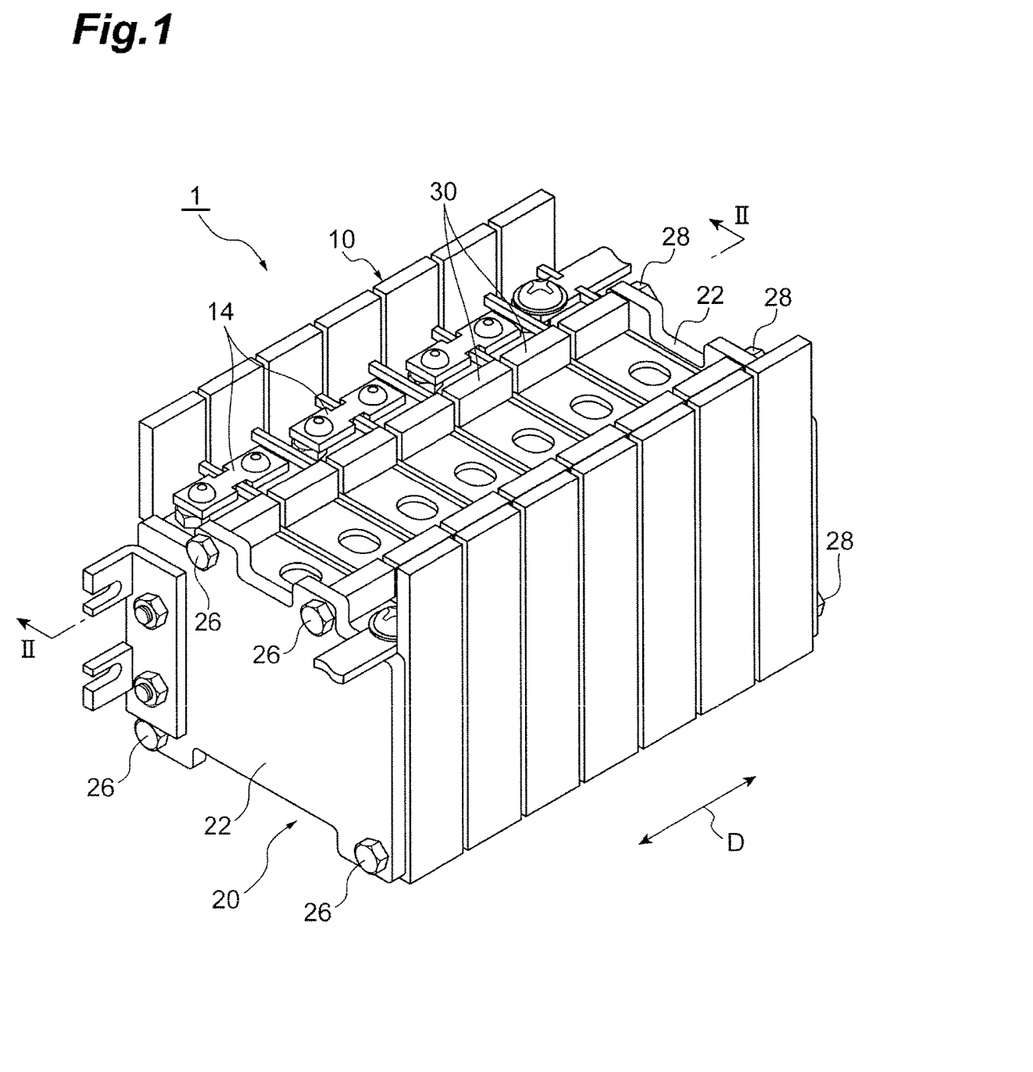
FIG. 1 is a perspective view of a battery module according to a first embodiment.
Figure 2:
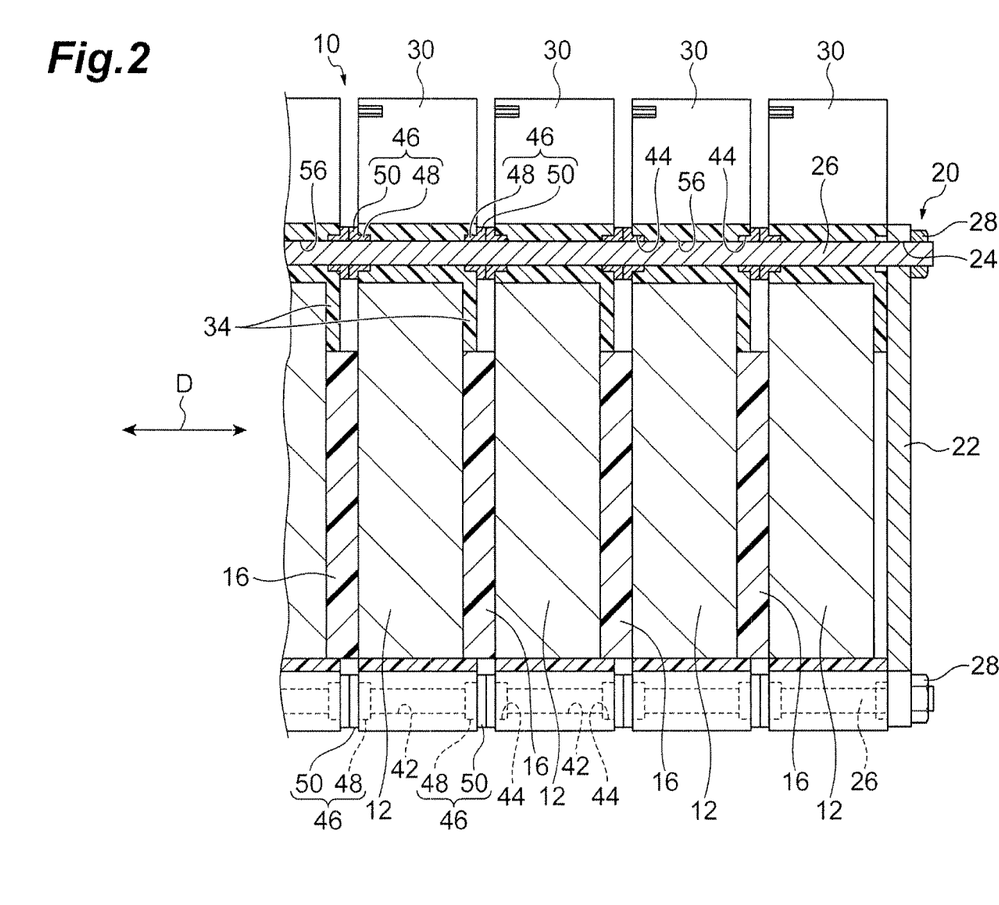
FIG. 2 is a schematic cross-sectional view taken along II-II line of FIG. 1.

FIG. 1 is a perspective view of a battery module 1 according to a first embodiment. FIG. 2 is a schematic cross-sectional view taken along II-II line of FIG. 1. For example, the battery module 1 is used in a state in which a plurality of battery modules 1 is accommodated in a housing to form a battery pack.

As illustrated in FIG. 1 and FIG. 2, the battery module 1 includes an array body 10 and a restraint member 20 for restraining the array body 10. The array body 10 includes a plurality of battery cells 12 arranged along a predetermined array direction D, and elastic members 16 (FIG. 2) disposed between adjacent battery cells 12.

The battery cell 12 is a battery in which an electrode assembly is accommodated in a rectangular box-shaped case. For example, the battery cell 12 is a nonaqueous electrolyte secondary battery such as a lithium ion secondary battery. In this example, seven battery cells 12 are arranged along the array direction D. Electrode terminals of the adjacent battery cells 12 are electrically connected to each other by a bus bar 14 (FIG. 1). In this way, the adjacent battery cells 12 are electrically connected in series. Each of the battery cells 12 is held by a cell holder 30. A configuration of the cell holder 30 will be described below.

For example, the elastic member 16 is formed in a flat plate shape using rubber. In this example, as illustrated in FIG. 2, the elastic member 16 is disposed to come into contact with the adjacent battery cells 12. The elastic member 16 is compressively deformed by a predetermined restraining load (with a predetermined compression ratio) in the array direction D due to a restraining load from the restraint member 20. When the battery cell 12 expands in the array direction D due to deterioration, overcharging, etc. the elastic member 16 is compressively deformed, whereby expansion of the battery cells 12 is allowed and the battery cells 12 are protected.

The restraint member 20 applies a constraining load to the array body 10 in the array direction D. The restraint member 20 has a pair of end plates 22 interposing the array body 10 from the array direction D, and a plurality of (in this example, four) connecting members 26 connecting the pair of end plates 22.

For example, the end plates 22 are formed in a flat plate shape using metal. Each of the end plates 22 is provided with a plurality of insertion holes 24 through which the connecting member 26 is inserted. For example, the connecting member 26 is a bolt made of a metal such as iron. Each of the connecting members 26 is successively inserted into an insertion hole 24 of one end plate 22, insertion holes 42 and 56 of each of cell holders 30 described below, and an insertion hole 24 of the other end plate 22, and is fastened by a nut 28 on the outside of the other end plate 22. A restraining load is applied to the array body 10 in the array direction D by this fastening.

Figure 3:
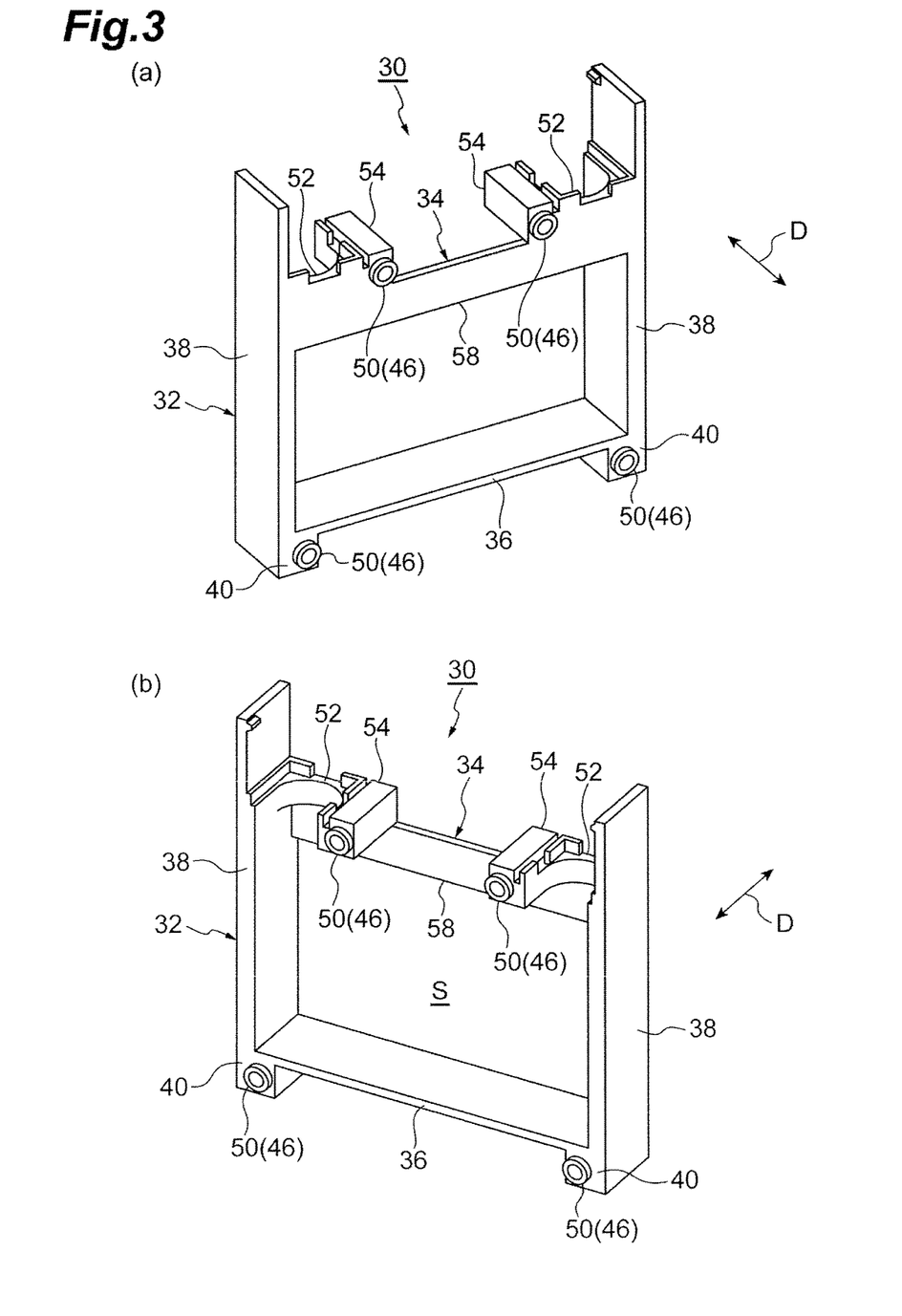
FIG. 3(a) is a perspective view of a cell holder viewed from one side in an array direction.
FIG. 3(b) is a perspective view thereof viewed from the other side.

FIG. 3(a) is a perspective view of the cell holder 30 viewed from one side in the array direction D, and FIG. 3(b) is a perspective view thereof viewed from the other side. For example, the cell holder 30 is made of resin except for a metal collar 46 to be described below. As illustrated in FIGS. 3(a) and 3(b), the cell holder 30 has a frame body portion 32 and a partition portion 34. The frame body portion 32 has a bottom plate 36 and a pair of side plates 38 erecting from both ends of the bottom plate 36. Each of both end portions of the bottom plate 36 is provided with a leg portion 40 that protrudes in a thickness direction of the bottom plate 36.

As illustrated in FIG. 2, each of the leg portions 40 is provided with a circular insertion hole 42 penetrating in the array direction D. The connecting member 26 is inserted into each of insertion holes 42. Cylindrical depressions 44 corresponding to the metal collar 46 described below are provided to both ends of the insertion hole 42. A diameter of a depression 44 is larger than a diameter of the other portion of the insertion hole 42. More specifically, a diameter of a portion of the insertion hole 42 other than the depression 44 is the same as a diameter of the connecting member 26 or slightly larger than the diameter of the connecting member 26. On the other hand, the diameter of the depression 44 is larger than the diameter of the other portion by at least a thickness of a cylindrical portion 48 of the metal collar 46 in a radial direction. In this way, the connecting member 26 and the metal collar 46 can be inserted into the depression 44.

For example, the metal collar (protrusion) 46 is formed in a tubular shape using a metal such as iron. The metal collar 46 has a cylindrical portion 48 and an annular flange portion 50 protruding outward in the radial direction from an outer surface at one end side in a longitudinal direction of the cylindrical portion 48. In this example, the cylindrical portion 48 and the flange portion 50 are flush with each other at the one end side. For example, diameters of the cylindrical portion 48 and the flange portion 50 are identical to the diameter of the insertion hole 42.

The metal collar 46 is inserted into each of the depressions 44 of the insertion hole 42. Specifically, a portion of the cylindrical portion 48 is inserted into the depression 44, and the flange portion 50 comes into contact with a side surface of the leg portion 40 in the array direction D. The metal collar 46 (the cylindrical portion 48) communicates with the insertion hole 42, and the connecting member 26 is inserted also into the metal collar 46. The metal collar 46 protrudes from the leg portion 40 in the array direction D by a length (thickness) of the flange portion 50 in the array direction D. That is, the metal collar 46 provides a protrusion protruding from the cell holder 30 in the array direction D. For example, the metal collar 46 may be formed integrally with the cell holder 30 by insert molding or may be integrated with the cell holder 30 by being inserted or press-fitted into the insertion hole 42 after forming the cell holder 30.

As illustrated in FIGS. 3(a) and 3(b), the partition portion 34 connects a pair of side plates 38 to each other. A pair of terminal accommodating portions 52 is provided on the partition portion 34. Each of the terminal accommodating portions 52 has a circular inner wall surrounding an electrode terminal. Further, a pair of square pole-shaped column portions 54 connected to the terminal accommodating portions 52 is provided on the partition portion 34.

Each of the column portions 54 is provided with the insertion hole 56 penetrating therethrough in the array direction D. For example, the insertion hole 56 has the same shape as that of the insertion hole 42 and has the depressions 44 at both ends thereof. The metal collar 46 is inserted into each of the depressions 44. The connecting member 26 is inserted into the insertion hole 56 and the metal collar 46 inserted into the insertion hole 56.

In the cell holder 30, an accommodation space S is formed by the frame body portion 32 and the partition portion 34. The battery cell 12 is held in the cell holder 30 when the battery cell 12 is accommodated in the accommodation space S. Movement of the battery cell 12 accommodated in the accommodation space S to one side in the array direction D is regulated by the partition portion 34. In an assembled state, the battery cell 12 is pressed toward the partition portion 34 by an elastic repulsive force from the elastic member 16. Further, in the cell holder 30, a rectangular opening 58 is formed by the frame body portion 32 and a lower end surface of the partition portion 34 of FIGS. 3(a) and 3(b). In this example, the elastic member 16 is disposed in the opening 58.

In the assembled state, as illustrated in FIG. 2, the metal collar 46 of one cell holder 30 abuts on the metal collar 46 of the cell holder 30 in the adjacent battery cell 12. That is, the cell holders 30 of the adjacent battery cells 12 come into contact with each other at the metal collars 46. In this way, the cell holder 30 is constrained, and a distance between adjacent cell holders 30 is regulated. In addition, when the distance between the adjacent cell holders 30 is defined, a distance between the adjacent battery cells 12 held by these cell holders is also defined. In this way, a compression amount of the elastic member 16 disposed between the battery cells 12 is regulated.

Figure 4:
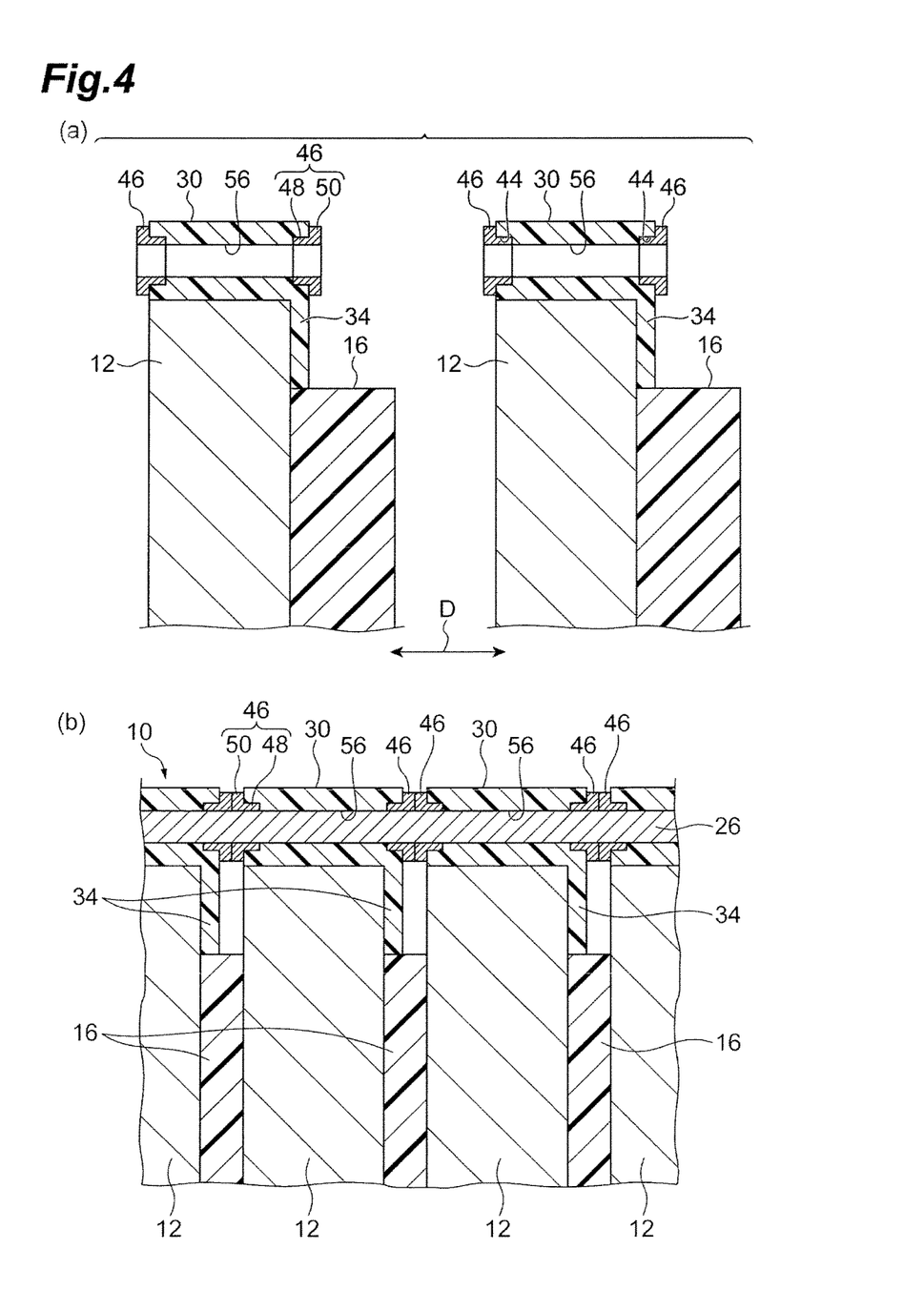
FIG. 4(a) illustrates a state before assembly.
FIG. 4(b) illustrates a state after assembly.

Next, a description will be given of an assembly process included in a method of manufacturing the battery module 1 with reference to FIGS. 4(a) and 4(b). FIGS. 4(a) and 4(b) are schematic cross-sectional views for description of the assembly process. FIG. 4(a) illustrates a state before assembly, and FIG. 4(b) illustrates a state after assembly. The elastic member 16 illustrated in FIG. 4 (a) is not compressively deformed. In the assembly process, a restraining load is applied in the array direction D using the restraint member 20 to the array body 10 including the battery cells 12 held by the cell holders 30 and arranged along the array direction D and the elastic members 16 disposed between the battery cells 12.

For example, first, as illustrated in FIG. 4 (a), the battery cell 12 which is held by the cell holder 30 and to which the elastic member 16 is attached on one side surface in the array direction D is prepared. For example, the elastic member 16 is attached to the battery cell 12 using an adhesive tape, etc. Then, battery cells 12 are arranged in the array direction D to form the array body 10. Subsequently, the array body 10 is interposed between the pair of end plates 22 in the array direction D, and the pair of end plates 22 is connected by the connecting member 26.

In this instance, as illustrated in FIG. 4(b), the compression amount of the elastic member 16 between the battery cells 12 is defined when the metal collar 46 of one (sell holder 30 abuts on the metal collar 46 of the cell holder 30 of the adjacent battery cell 12. The connecting member 26 may be inserted into the cell holder 30 after arranging the battery cells 12 to form the array body 10, or the connecting member 26 may be successively inserted into the cell holders 30 of the respective battery cells 12 in parallel with arrangement of the battery cells 12. The elastic member 16 may not be attached to the battery cell 12, and the elastic member 16 may be disposed between the battery cells 12 in parallel with arrangement of the battery cells 12.

As described above, in the battery module 1, the distance between the adjacent battery cells 12 in the array body 10 is defined by the metal collar 46 abutting on the metal collar 46 of the cell holder 30 of the adjacent battery cell 12. Therefore, in the battery module 1, at the time of assembly, the compression amount of the elastic member 16 between the battery cells 12 can be regulated only by adjusting a protrusion amount of the metal collar 46 (a length of the flange portion 50 in the array direction D) in advance and making the metal collar 46 abutting on the metal collar 46 of the adjacent cell holder 30. Thus, assembly workability is improved.

In addition, the metal collar 46 has a tubular shape and communicates with the insertion hole 42 or the insertion hole 56. Further, the connecting member 26 is inserted into the metal collar 46. Thus, a position shift of the cell holder 30 in a direction intersecting the array direction D is suppressed. In addition, in the cell holder 30, an area in which the connecting member 26 is inserted and an area in which the metal collar 46 is disposed correspond to a common area when viewed in the array direction D, and miniaturization the cell holder 30 is attempted.

Because the protrusion includes the metal collar 46, rigidity of the protrusion against the restraining load is increased by the metal collar 46, and damage to the protrusion is suppressed. In particular, in the battery module 1, the metal collar 46 is inserted in each of both ends of the insertion holes 42 and 56, respectively, and abuts on the metal collar 46 of the cell holder 30 in the adjacent battery cell 12. The rigidity of the protrusion is ensured, and creep deformation of the protrusion is suppressed by adopting a configuration in which the metal collars 46 abut on each other as described above.

Modified Examples

Figure 5:
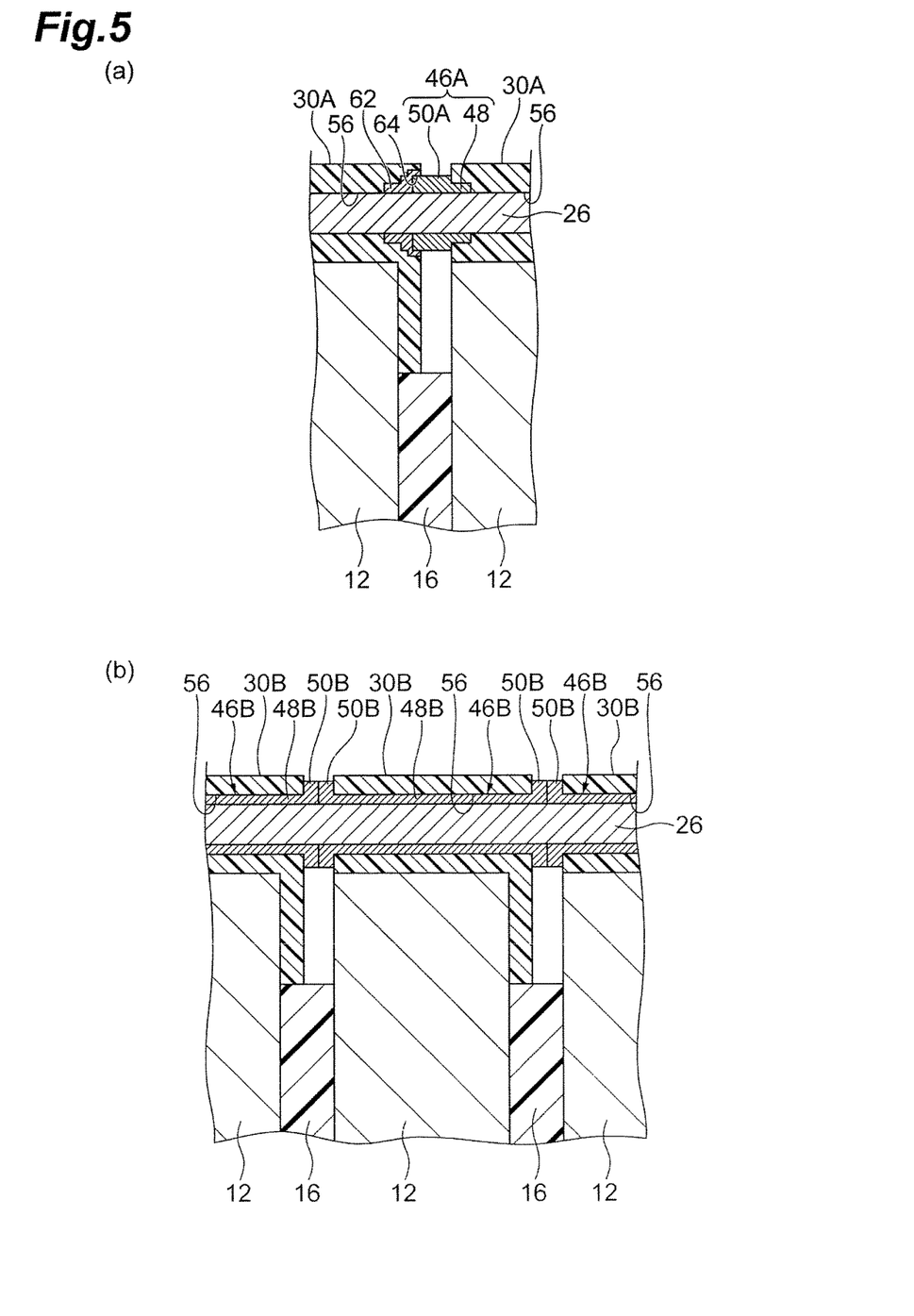
FIG. 5(a) is a schematic cross-sectional view of a battery module according to a first modified example.
FIG. 5(b) is a schematic cross-sectional view of a battery module according to a second modified example.

FIG. 5(*a*) is a schematic cross-sectional view of a battery module according to a first modified example, and FIG. 5(*b*) is a schematic cross-sectional view of a battery module according to a second modified example. As illustrated in FIG. 5(*a*), in a cell holder 30A of the first modified example, a metal collar 46A (protrusion) is inserted into one end of an insertion hole 56, and a metal collar 62 having a depression 64 corresponding to the metal collar 46A is inserted into the other end of the insertion hole 56. A thickness of a flange portion 50A of the metal collar 46A is larger than a thickness of the flange portion 50 of the metal collar 46 of the first embodiment. For example, the depression 64 is formed in a cylindrical shape, and a connecting member 26 and the flange portion 50A may be inserted into the depression 64. Further, a metal collar 46A of a cell holder 30A in an adjacent battery cell 12 abuts on a bottom surface of the depression 64. Similarly to the insertion hole 56 side, the metal collars 46A and 62 may abut on each other at an insertion hole 42 side. Further, similarly to the first embodiment, the metal collars 46 may be inserted into both ends respectively at the insertion hole 42 side.

In the battery module of the first modified example, an assembly workability is improved similarly to the above first embodiment. In addition, the rigidity of the protrusion is ensured, and creep deformation of the protrusion is suppressed by adopting a configuration in which the metal collars 46A and 62 abut on each other. In addition, a position shift of the cell holder 30A in the direction intersecting the array direction D is further suppressed.

As illustrated in FIG. 5(*b*), in a cell holder 30B of the second modified example, a metal collar 46B (protrusion) extends in an insertion hole 56 to protrude from both ends of the insertion hole 56. That is, in the metal collar 46B, the cylindrical portion 48B extends in the insertion hole 56 to protrude from the both ends of the insertion hole 56, and a flange portion 50B protrudes from outer surfaces on both end sides in a longitudinal direction of the cylindrical portion 48B. Further, the metal collar 46B abuts on a metal collar 46B of a cell holder 30B in an adjacent battery cell 12. On an insertion hole 42 side, metal collars 46B may abut on each other similarly to the insertion hole 56 side. At the insertion hole 42 side, the metal collar 46 may be inserted into both ends similarly to the first embodiment, or metal collars 46A and 62 may abut on each other similarly to the first modified example.

In the battery module of the second modified example, an assembly workability is improved similarly to the above first embodiment. In addition, the rigidity of the protrusion is ensured, and creep deformation of the protrusion is suppressed by adopting a configuration in which the metal collars 46B abut on each other. In addition, damage to the cell holder 30B is suppressed because the whole restraining load acts on the metal collar 46B.

Second Embodiment

Figure 6:
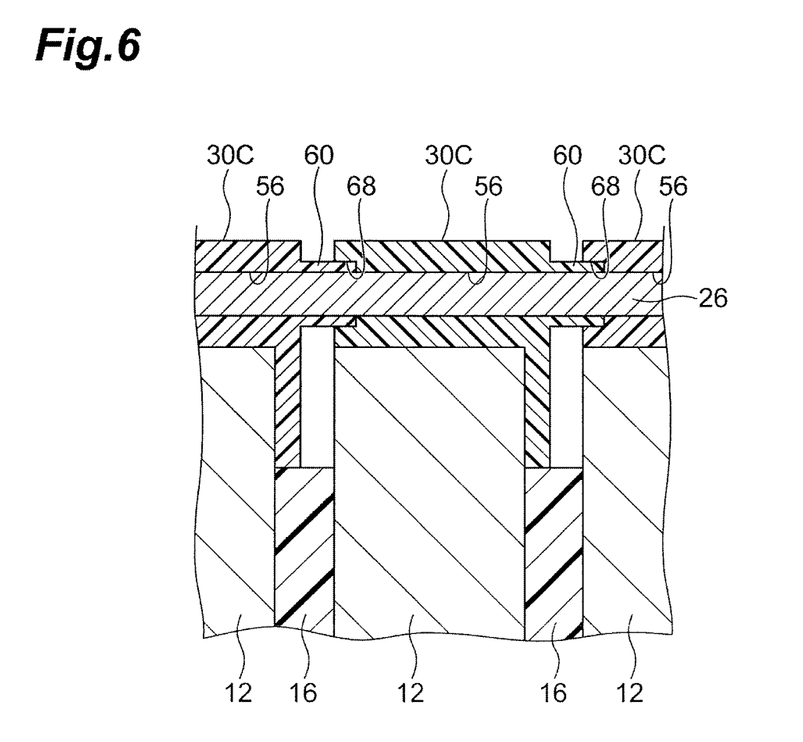
FIG. 6 is a schematic cross-sectional view of a battery module according to a second embodiment.

FIG. 6 is a schematic cross-sectional view of a battery module according to a second embodiment. As illustrated in FIG. 6, in a cell holder 30C of a second embodiment, the metal collar 46 is not provided, and a tubular portion 66 (protrusion) protruding in an array direction D is provided on one side surface of a column portion 54 in the array direction D. For example, the tubular portion 66 is formed in a cylindrical shape using the same resin as that of another portion in the cell holder 30C and communicates with an insertion hole 56. In addition, a depression 68 corresponding to the tubular portion 66 is provided at one end of the insertion hole 56. For example, the depression 68 has a cylindrical shape, and a connecting member 26 and the tubular portion 66 may be inserted into the depression 68. In addition, a tubular portion 66 of a cell holder 30C in an adjacent battery cell 12 abuts on a bottom surface of the depression 68. An insertion hole 42 may be configured similarly to the insertion hole 56 side.

In the battery module of the second embodiment, an assembly workability is improved similarly to the above first embodiment. In addition, the tubular portion 66 has a tubular shape and communicates with the insertion hole 56. Further, the connecting member 26 is inserted into the tubular portion 66. Thus, a position shift of the cell holder 30 in a direction intersecting the array direction D is suppressed. In addition, in the cell holder 30C, an area in which the connecting member 26 is inserted and an area in which the tubular portion 66 is disposed correspond to a common area when viewed in the array direction D, and miniaturization the cell holder 30C is attempted.

Even though the preferred embodiments of the invention have been described above, the invention is not limited to the above-described embodiments, and may be modified within a scope not changing subject matter described in each claim, or applied to another embodiment.

For example, the protrusion may abut on the cell holder 30 of the adjacent battery cell 12 and may be formed in a shape other than the tubular shape. For example, the protrusion may protrude in the array direction D from the whole side surface of the leg portion 40 and the column portion 54 in the array direction D and may have a rectangular shape. However, assembly accuracy is easily ensured when the protrusion having the tubular shape abuts thereon as in the above embodiment because a contact area between the protrusion and the cell holder 30 is small. The protrusion may not communicate with the insertion holes 42 and 56. For example, the protrusion may be formed in a gutter shape, a flat plate shape, a bar shape, etc. For example, the protrusion may be provided at another portion of the cell holder 30.

In the above embodiments, the elastic member 16 is disposed in the opening 58 of the cell holder 30, and the elastic member 16 comes into contact with each of the adjacent battery cells 12 interposing the elastic member 16 therebetween. However, the invention is not limited thereto. For example, the opening 58 may not be formed, and it is possible to employ a configuration in which one side of the accommodation space S in the array direction D is closed by the partition portion 34, one whole side surface of the elastic member 16 in the array direction D comes into contact with the partition portion 34, and the other whole side surface of the elastic member 16 in the array direction D comes into contact with the battery cell 12. Alternatively, a positional relation between the elastic member 16 and the battery cell 12 in the array direction D may be changed such that the other whole side surface of the elastic member 16 in the array direction D comes into contact with the partition portion 34, and the one whole side surface of the elastic member 16 in the array direction D comes into contact with the battery cell 12.

REFERENCE SIGNS LIST

1 . . . battery module, 10 . . . array body, 12 . . . battery cell, 16 . . . elastic member, 20 . . . restraint member, 22 . . . end plate, 26 . . . connecting member, 30, 30A, 30B, 30C . . . cell holder, 42, 56 . . . insertion hole, 46, 46A, 46B . . . metal collar (protrusion), 62 . . . metal collar, 64, 68 . . . depression, 66 . . . tubular portion (protrusion), D . . . array direction.

The invention claimed is:

1. A battery module comprising:
    an array body including a plurality of battery cells held by cell holders and arranged along a predetermined array direction and elastic members disposed between adjacent battery cells; and
    a restraint member applying a restraining load to the array body in the array direction,
    wherein the cell holder has a protrusion protruding in the array direction, and a compression amount of the elastic member between the battery cells is regulated by the protrusion abutting on a cell holder of an adjacent battery cell,
    wherein the restraint member includes a pair of end plates interposing the array body in the array direction, and a connecting member connecting the pair of end plates to each other,
    wherein the cell holder has an insertion hole, the connecting member being inserted into the insertion hole, and the protrusion has a tubular shape and communicates with the insertion hole,
    wherein the insertion hole has a depression corresponding to the protrusion, and the protrusion of the cell holder in the adjacent battery cell abuts on a bottom surface of the depression, and
    wherein the bottom surface of the depression is orthogonal to the array direction.

2. The battery module according to claim 1, wherein the protrusion includes at least one metal collar inserted into the insertion hole.

3. The battery module according to claim 2, wherein the at least one metal collar comprises a pair of metal collars, and each of the metal collars is inserted into both ends of the insertion hole respectively and abuts on a metal collar of the cell holder in the adjacent battery cell.

4. The battery module according to claim 2, wherein the protrusion is inserted into one end of the insertion hole, a metal collar having a depression corresponding to the protrusion is inserted into the other end of the insertion hole, and the protrusion of the cell holder in the adjacent battery cell abuts on a bottom surface of the depression.

5. The battery module according to claim 2, wherein the metal collar extends in the insertion hole to protrude from both ends of the insertion hole, and abuts on a metal collar of the cell holder in the adjacent battery cell.

* * * * *